(12) United States Patent
El-Yaniv et al.

(10) Patent No.: US 9,361,376 B2
(45) Date of Patent: Jun. 7, 2016

(54) METHOD FOR DELIVERING QUERY RESPONSES

(75) Inventors: Ran El-Yaniv, Haifa (IL); Roy Friedman, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 121 days.

(21) Appl. No.: 12/530,460

(22) PCT Filed: Mar. 6, 2008

(86) PCT No.: PCT/IL2008/000300
§ 371 (c)(1),
(2), (4) Date: Sep. 9, 2009

(87) PCT Pub. No.: WO2008/107895
PCT Pub. Date: Sep. 12, 2008

(65) Prior Publication Data
US 2010/0287186 A1    Nov. 11, 2010

Related U.S. Application Data

(60) Provisional application No. 60/893,633, filed on Mar. 8, 2007.

(51) Int. Cl.
*G06F 17/30* (2006.01)

(52) U.S. Cl.
CPC ................................ *G06F 17/30864* (2013.01)

(58) Field of Classification Search
None
See application file for complete search history.

(56) References Cited

U.S. PATENT DOCUMENTS

| | | | |
|---|---|---|---|
| 6,289,337 B1 * | 9/2001 | Davies et al. | |
| 2002/0073080 A1 * | 6/2002 | Lipkin | 707/3 |
| 2002/0188841 A1 * | 12/2002 | Jones et al. | 713/153 |
| 2003/0014478 A1 * | 1/2003 | Noble | 709/203 |
| 2005/0114527 A1 * | 5/2005 | Hankey et al. | 709/228 |
| 2008/0139191 A1 * | 6/2008 | Melnyk et al. | 455/419 |

FOREIGN PATENT DOCUMENTS

WO    WO 2008/107895    9/2008

OTHER PUBLICATIONS

International Preliminary Report on Patentability Dated Jan. 21, 2010 From the International Bureau of WIPO Re. Application No. PCT/IL2008/00300.
International Search Report Dated Mar. 11, 2009 From the International Searching Authority Re. Application No. PCT/IL2008/00300.
Written Opinion Dated Mar. 11, 2009 From the International Searching Authority Re. Application No. PCT/IL2008/00300.

* cited by examiner

*Primary Examiner* — Son T Hoang

(57) ABSTRACT

A method and computing program for providing a user computing platform with a response to a query, the response comprising indications to one or more Universal Resource Identifier optionally with instructions on how to get the relevant information from there, and how to format the response. Thus a user computing platform receives information directly from a content provider, whose rights are not infringed by the query engine. If payment or other limitations are imposed by the content provider or by the user, they are handled between the user and the content provider, without intervention by the query engine.

20 Claims, 4 Drawing Sheets

THE OFFICIAL SITE OF THE NEW YORK YANKEES: HOMEPAGE
NEW YORK YANKEES, AMERICAL LEAGUE, NATIONAL LEAGUE,
MAJOR LEAGUE BASEBALL. SELECT
TIMEFRAME, 2007, 2006, 2005, 2004, 2003, 2002, 2001 ...
YANKEES.MLB.COM/NASAPP/MLB/NYY/HOMEPAGE/NYY_HOMEPAGE.JSP-82K
CACHED - SIMILAR PAGES

NEW YORK YANKEES - WIKIPEDIA, THE FREE ENCYCLOPAEDIA
AND PHOTOGRAPHS.
EN.WIKIPEDIA.ORG/WIKI/NEW_YORK_YANKEES-373K- CACHED - SIMILAR PAGES

104  NEWS RESULTS FOR NEW YORK YANKEES

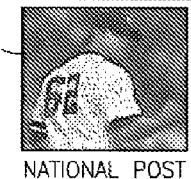

REPORT: NEW JOBA RULES FOR YANKEES' CHAMBERLAIN    108
-15 HOURS AGO
NEW YORK, NY (SPORTS NETWORK) - NEW YORK YANKEES
PITCHER JOBA CHAMBERLAIN WILL
REPORTEDLY START THE SEASON IN THE BULLPEN,
BEFORE HEADING TO THE MINOR ...

NATIONAL POST   SPORTS NETWORK - 96 RELATED ARTICLES >>
PIRATES SIGN 1B MIENTKIEWICZ - NATIONAL POST -
73 RELATED ARTICLES >>
NEW MAN IN LEGENDS FIELD MANAGER'S OFFICE;
NEW BOSSES UPSTAIRS -
THE CANADIAN PRESS - 41 RELATED ARTICLES >>

NEW YORK YANKEES TICKETS, NEW YORK YANKEES BASEBALL TICKETS AT TICKCO
NEW YORK YANKEES TICKETS AVAILABLE FOR ALL HOME AND AWAY GAMES.
GET A GUIDE TO THE
GAME, A 2008 NEW YORK YANKEES SCHEDULE, YANKEE STADIUM SEATING ...
WWW.TICKCO.COM/BASEBALL/NEW_YORK_YANKEES_TICKETS.HTM-25k-
CACHED - SIMILAR PAGES

NEW YORK YANKEES TICKETS - TICKETSNOW HAS DEALS ON NEW YORK...
GET DEALS ON NEW YORK YANKEES TICKETS AND OTHER MLBH TICKETS FROM
TICKETSNOW. PREMIUM NEW YORK YANKEES TICKET DEALS AVAILABLE
TO MATCH EVERY BUDGET.
WWW.TICKETSNOW.COM/MBL_BASEBALL_TICKETS/NEW_YORK_YANKEES_TICKETS.
HTML-142K-CACHED - SIMILAR PAGES

NEW YORK YANKEES TICKETS - 2008 YANKEES SCHEDULE - YANKEES ...
THE WIDEST SELECTION OF NEW YORK YANKEES TICKETS - GOTICKETS IS YOUR
SPORTS SOURCE FOR PREMIUM TICKETS, FEATURING NO HIDDEN FEES
OR SERVICE CHARGES.
WWW.GOTICKETS.COM/SPORTS/MLB/AL/NEW_YORK_YANKEES_.PHP-31K-
CACHED - SIMILAR PAGES

ESPN - NEW YORK YANKEES NEWS, SCHEDULE, PLAYERS, SCORES, STATS ...
FEATURES NEWS, BOX SCORES, STANDINGS, STATISTICS, UPCOMING SCHEDULE
AND RELATED MULTIMEDIA.
SPORTS.ESPN.GO.COM/MBL/CLUBHOUSE?TEAM=NYY-94K- CACHED - SIMILAR PAGES

NEW YORK YANKEES NEWS, SCORES, SCHEDULE, STATS-YAHOO! SPORTS
COMPREHENSIVE AND UP-TO-DATE NEW YORK YANKEES NEWS, SCORES, SCHEDULES,

FIG.1

METHOD FOR DELIVERING QUERY RESPONSES

RELATED APPLICATIONS

The present application claims priority from U.S. Provisional Patent Application No. 60/893,633 filed on Mar. 8, 2007.

TECHNICAL FIELD

The present disclosure relates to delivering web pages in general, and to a method and computer program for generating a web page which does not contain snippets of information from other sites, in particular.

BACKGROUND

Search engines and other applications, such as price comparison web sites generate web pages that may contain snippets of information taken from other sites in response to user queries. Such applications or web sites typically return web page or another structure which comprises addresses, such as Universal Resource Locators (URLs) together with a snippet of information taken from the address. The snippet of information may comprise text, partial text, images, miniaturized images, or any other information.

Such web pages impose a number of problems. First, the snippet of information may include copyrighted material, which may not be used by others without permission of the right holder. Thus, presenting the information by the application may infringe on the right holder's rights and expose the application manufacturer to legal actions. A similar problem is related to web sites that provide content only to subscribers or other paying entities. The search engine may pay such web site once, and receive information which is then provided to multiple users, who may not access the information without paying.

Another problem relates to content control, such as parental or employer control. Even the information snippet presented may contain materials which should not be accessible to the specific user. For example, a parent or an employer may preclude his or her child or employee from accessing certain web sites or web site types. However, since the browser executed by the specific computer does not access these sites or site types directly, but rather a search engine accesses them, such control may be bypassed by presenting the information snippet to the child or employee.

Refer for example to FIG. 1, showing a web page 100 comprising search results for the term "New York Yankees". The web comprises multiple entries, some of which may comprise a picture 104 or content 108, any or both of which may be protected by copyright, subject to payment or otherwise restricted.

There is thus a need for a method and apparatus that will enable a search engine or another application or web site, to provide information to a user without infringing copyrights or other rights of a content provider, and while adhering with control mechanisms when displaying information from web sites.

SUMMARY

A method and structure of response for avoiding copyright or other rights infringement by a query engine, by the query engine sending only links, addresses or other location indications, possibly with formatting instructions or instructions on how to retrieve the data from the indicated location.

In a preferred embodiment of the disclosure there is thus provided in a computer network comprising one or more user computing platforms, a query engine executed by a computing platform, and one or more content servers, a method for providing a response to a query sent from a user computing platform to the query engine, the method comprising the steps of: the query engine determining a uniform resource identifier associated with a content server; the query engine constructing a response to the query, the response comprising one or more uniform resource identifiers, the response adapted to request predetermined content from the content server. The method optionally comprises the step of the user computing platform parsing the response and retrieving information from the content server. Within the method, the response optionally comprises one or more formatting indications. The formatting indications are optionally one or more a Cascading Style Sheets commands. The method optionally comprises a step of displaying the response and the information retrieved from the content servers according to the formatting indications or according to pre-stored formatting indications. The method can further comprise one or more instructions related to retrieving information from the content servers. The instructions are optionally JavaScript commands. Within the method, the instructions are optionally parsed by a plug-in application. The method optionally comprises a searching step for determining the uniform resource identifier. Within the method, the response optionally comprises indications for a Universal Resource Identifier, a miniaturized image, text, statistical data related to a web page associated with the URI, opinion related to the web page, or a combination thereof. Within the method, the response optionally comprises a description of a web page. The method optionally comprises a caching step performed by the query engine or a pre-fetching or caching step performed by the user computing platform.

Another aspect of the disclosure relates to a response to a query issued by a user computing platform to a query engine, the response comprising one or more uniform resource identifiers, the response adapted to request predetermined content from a content server associated with the uniform resource identifiers. The response is optionally in HTTP or HTTPS format. The response optionally comprises one or more formatting commands.

Yet another aspect of the disclosure relates to a computer readable storage medium containing a set of instructions for a general purpose computer, the set of instructions comprising: a query engine determining a uniform resource identifier associated with a content server, relevant for a response to a query sent by a user computing platform; and the query engine constructing a response to the query, the response comprising the uniform resource identifier, the response adapted to request predetermined content from the content server.

BRIEF DESCRIPTION OF THE DRAWINGS

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are designated by the same numerals or letters.

FIG. 1 is a schematic illustration of a web page demonstrating the problem;

DETAILED DESCRIPTION

In a preferred embodiment of the disclosure, a site such as a site comprising a query engine or a search engine, a search site, a price comparison site, a travel service directory or any other directory, a news site possible containing information from multiple sites, or other site (hereinafter "query engine") is accessed by a user requesting information. The query engine traditionally returns to the user one or more references to one or more other sites (hereinafter "content site"), and optionally a snippet of information taken from one or more of the sites, such as one or more words, sentences, paragraphs, images, music, voice, video or any other content, formatted by the query engine or search site.

In order to avoid copyright infringement or other violations created by the query engine sending the information snippet to the user, the query engine, instead of providing the user with the information as extracted from the content site, returns a link or other location indication, such as a Universal Resource Identifier (URI) or Universal Resource Locator (URL) or any other reference, with instructions, directions, or other hints on where to find the relevant information, and how to format it.

The user's browser receives the information, which includes one or more such hints or instructions, follows the instructions for example by performing computer instructions such as JavaScript commands and accessing the content sites, and formats the response according to the instructions received from the query engine. The resulting response is the same or a more updated version of the response as would have been provided directly by the query engine. The result is more updated if any of the content sites has changed since the information was last cached by the search engine.

Figure 2A:
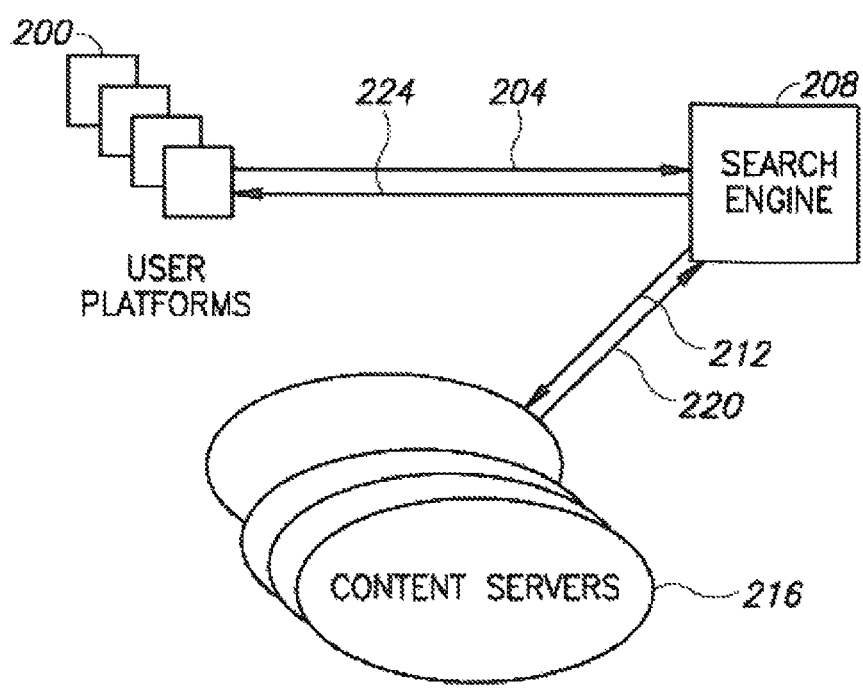
FIG. 2A is a schematic illustration of the environment and a flow of building a response to a query in current systems as taught by the prior art.
Figure 2B:
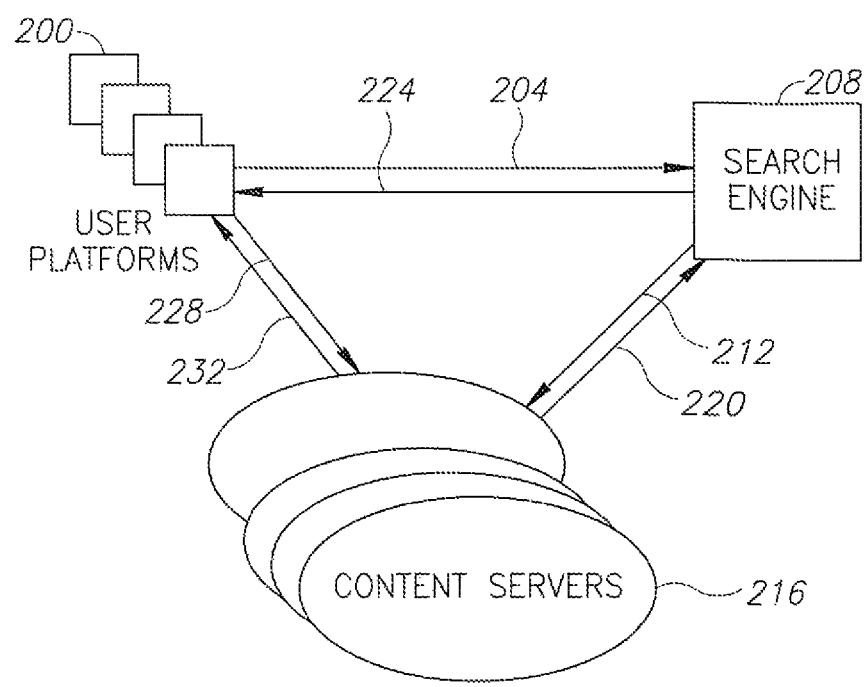
FIG. 2B is a schematic illustration of the environment and a flow of building a response to a query in accordance with a preferred implementation of the disclosure.

Referring now to FIG. 2A showing the flow of information in prior art methods and FIG. 2B, showing the flow of information in the disclosed method. The environment in which the FIG. 2A and FIG. 2B, showing disclosure is used, typically comprises one or more users using user platforms 200 which can display information such as web pages; one or more query engines, which are preferably computerized applications executed on search computing platform 208, and one or more content servers 216 which typically contain information, preferably arranged as web pages. All components of the system, including user platforms 200, search computing platform 208 and content servers 216 are preferably implemented as computing platforms, such as a personal computer, a mainframe computer, or any other type of computing platform provisioned with a memory device (not shown), a CPU or microprocessor device, and several I/O ports (not shown). It will be appreciated by a person skilled in the art that content servers 216 comprise or have access to databases or other software, firmware or hardware components for offering access to the content. User platform 200 can alternatively be a mobile device, such as a Personal Digital Assistant (PDA), a smart phone, or a mobile device having browsing capabilities. User platforms 200, search computing platform 208 and content servers 216 are preferably connected via communication channels, such as a local area network (LAN), a wide area network (WAN), the Internet, Intra-net, telephone network, voice over IP, wireless communication such as wireless LAN, or the like, employing commonly used protocols such as TCP, IP, IPTV or derivatives thereof, or protocols that will be developed in the future. Content servers 216 are optionally third party servers, and are not related to the search computing platform 208.

The browser executed by user platform 200, query engines executed by search computing platform 208, and web server applications executed by content servers 216 are typically sets of interrelated computer instructions, arranged in executables, libraries, modules, scripts or other units. The units can be programmed in any programming language or script language and under any development environment.

In prior art systems, as shown in FIG. 2A, a user using user platform 200 issues a query 204, such as a search query, to a query engine executed by search computing platform 208. The query engine sends a request 212 to one or more web servers executed by content servers 216 and extracts information 220. Search computing platform 208 then preferably constructs a web page, such as an HTML page, or any other structure such as an XML structure, comprising URLs associated with web servers executed by content 216, information 220, and formatting commands for the web page for example Cascading Style Sheets (CSS) commands, and sends web page 224 back to user platform 200. The client's browser receives web page 224, including information 220 extracted by the search engine from web servers 216 and displays it according to the formatting commands. In an alternative embodiment, the formatting commands are not sent per each response but are rather stored in the user platform 200 and used for formatting all responses from one or more query engines. The formatting commands, whether as part of the response or pre-stored may include commands related to font, color or size or text, location and size of information snippets on a displayed page, size resolution and colors of images, or the like.

In the disclosed invention, as illustrated in FIG. 2B, information 220 is not incorporated into web page or other response 224. Rather, the response is adapted to request predetermined content from the content server. The response thus comprises instructions or hints, such as JavaScript commands related to how to obtain the information are incorporated into web page 224 and sent to user platform 200. A browser or another program executed by user platform 200 receives the response such as the web page including the instructions. The browser then executes the hints and sends requests 228 to the web servers executed on content server 216 directly, the web servers retrieve the required information 232, and sends it back to the user's browser. The user's browser then displays information 232 as part of the displayed page according to the formatting commands sent with response 224.

Thus, the same information is displayed by the browser in the same manner as in the prior art, but the information is not extracted by the search engine. Rather the information is retrieved directly by the browser. Thus, the search engine does not infringe any rights of the data owners. Further, since the user's browser accesses the content server directly, it is subject to all payment requirements, control policies or other limitations associated with accessing the content. Another advantage of the disclosure relates to caching. In prior art systems the data may be cached by the search engine in order to search more efficiently, but in the disclosure the data is retrieved directly and may thus be more updated.

Figure 3:
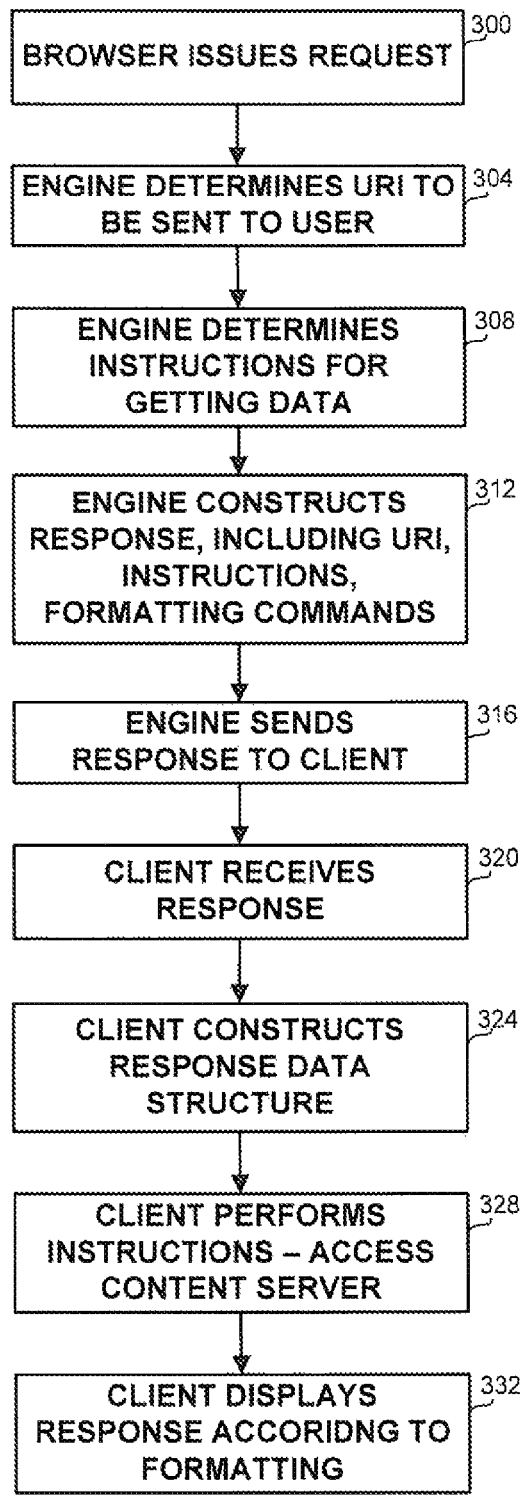
FIG. 3 is a flowchart of the main steps in a preferred embodiment of a method of the disclosure.

Referring now to FIG. 3, showing a flowchart of the main steps in a preferred embodiment of a method of the disclosure. On step 300 the user's browser issues a request to a query engine, such as a search engine, a web directory, or any other site that returns results from additional sites. On step 304 the query engine, directory or the like determines one or more URLs, Uniform Resource Identifier (URI), direct IP or any other indication to a location from which information is to be retrieved. Processing the query may involve reverse indexing or other pre-processed data concerning for example words, topics, synonyms, tags, web-site related data or the like. Processing the query may further involve contacting the content servers. Determining the URI can further comprise a searching step, for example when the query engine is a search engine.

On step 308 the query engine determines the instructions to be followed to extract the required information from the URI. The instructions can be stated as JavaScript commands or any other dynamic content manipulation scripting language. On step 312 the query engine constructs the response to the query, including the URIs and optionally instructions for retrieving the information from the content servers when the response is parsed by the user computing platform. The response may further include the general design and formatting indications for the response, possibly expressed using Cascading Style Sheets (CSS) commands, associated URIs and instructions, and optionally URIs and information snippets retrieved from sites which are not protected in any way. The response can further include advertisements or other data optionally associated with the query. The response can be phrased in any meta-language, such as XML, HTML, DHTML, or any other language currently known or that will be developed in the future.

On step 316 the query engine sends the response to the client, and on step 320 the client receives the response. On step 324 the client parses the response received on step 320 and constructs relevant data structure for the response, for example a Document Object Module (DOM) representing a web page. On step 328, when processing the data structure, the instructions embedded therein, as provided by the query engine are executed for extracting the information snippets, such as the text or images from the associated content servers. The instructions are preferably executed by executing the commands or activating a relevant client-side method, preferably in the form of a plug-in. The instructions related to a particular URI may be empty, in which case all content is retrieved from the URI. Alternatively, the instructions may relate to extracting only part of the information from the content server, or to processing the information by the browser after retrieval from the content server. When miniaturized images are to be displayed as part of the response, the images can be miniaturized either by the content server or by the browser applying standard miniaturization techniques prior to displaying the images. When extracting the information, the client performs the instructions in order to retrieve the hinted information from the content servers. Thus, the browser optionally issues fetching commands, such as "HTTP Get" commands, so the content server receives a regular HTTP or HTTPS command. The commands can also be issued using any currently known protocol, or any protocol that will be developed in the future. Thus, the content server receives the requests and sends the response directly to and from the user's platform rather than via the query engine. On step 332 the client displays the resulting response, presenting the data retrieved on step 328 and possibly data received as part of the response. In some exemplary embodiments, no JavaScript commands are required, as the information snippets can be retrieved using only a URI with corresponding CSS commands. Possible formatting thus includes displaying a relatively small portion of the retrieved information in a regular manner, and showing additional information as a floating window when the user hovers above the snippet.

It will be appreciated by a person skilled in the art that the response to the query can comprise all elements currently being parts of responses, including but not limited to URIs, miniature images, text, statistical data related to a web page, opinion related to a web page or a combination thereof. Some of the information may be transmitted according to the disclosure, while other parts are optionally transmitted in a regular manner, with the query engine retrieving information from the content server.

The disclosed method enables a query engine to provide results to a user without violating copyrights or other access limitations. The method also enables the enforcement of limitations applied to the user's browser, such as parental or employer control limitations. In addition, when heavy processing is required for retrieving information, it is the user's platform that carries the burden, for example in terms of memory, CPU and bandwidth, rather than the search engine, thus allowing the search engine to provide faster responses to other users and be more scalable.

It will be appreciated by a person skilled in the art that the instructions can be provided in any scripting or programming language. If a proprietary language is used, a parser or compiler for the language should be installed and recognized by the browser, preferably as a plug-in of the browser.

A caching mechanism can be enabled, so that data from content servers retrieved by the query engine is cached for making further accesses faster and more efficient.

In a preferred embodiment, a pre-fetching and caching steps can be performed by the user computing platform, so that data known to be often required by a user is retrieved off-line and cached, so that it is efficiently available when required.

It will be appreciated by a person skilled in the art that multiple variations and options can be designed along the guidelines of the disclosed method.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation, material, step of component to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A method utilizing a computerized processor for retrieving information, comprising:

accessing, by a user using a web browser on a user device, a site comprising a search engine and entering a search query comprising a textual search term into the search engine;

processing, at the search engine side, using the computerized processor, the search query by analyzing words, topics, synonyms, or tags of a plurality of content servers;

identifying, at the search engine side, using the computerized processor, a plurality of uniform resource identifiers (URIs) of the plurality of content servers which hosts contents corresponding with search results to the search query generated based on the processing, wherein the identifying includes accessing the plurality of content servers by the search engine;

constructing, at the search engine side, browser instructions which include the plurality of URIs and instructions for extracting information snippets of content from each of the plurality of content servers using the plurality of URIs, wherein the information snippets corresponding with the search results to the search query from each of the plurality of content servers directly;

forwarding the browser instructions from the search engine to the user device as a response to the search query, wherein the response includes format instructions for the information snippets and does not include any copyrighted information from the plurality of content servers;

receiving the browser instructions at the user device;

processing, the browser instructions at the user device to trigger a transmission from the user device of requests for extracting the information snippets from the plurality of content servers by the web browser which is installed in the user device and using the plurality of URIs;

retrieving, at the user device, the information snippets directly from the plurality of content servers and not from the search engine;

formatting, at the user device, the retrieved information snippets according to the format instructions in the received response; and displaying the formatted information snippets to the user, wherein the browser instructions do not include any copyrighted information from the plurality of content servers.

2. The method of claim 1, wherein the forwarding facilitates parsing the response at the user device and retrieving the information snippets from the plurality of content servers.

3. The method of claim 1, wherein the response further comprises at least one formatting indication for parsing at least some of the information snippets.

4. The method of claim 3, wherein the formatting indication is a Cascading Style Sheets command.

5. The method of claim 3, wherein the forwarding facilitates displaying the information snippets from each of the plurality of content servers according to the at least one formatting indication.

6. The method of claim 1, wherein the forwarding facilitates displaying the information snippets from each of the plurality of content servers according to formatting indications pre-stored in the user device.

7. The method of claim 1, wherein the response further comprises at least one instruction related to retrieving the information snippets from the plurality of content servers.

8. The method of claim 7, wherein the at least one instruction is a JavaScript command.

9. The method of claim 7, wherein the at least one instruction is parsed by a plug-in application installed in the user device.

10. The method of claim 1, wherein the identifying comprising searching for the plurality of URIs over a computer network.

11. The method of claim 1, wherein the response comprises, per each of the plurality of URIs, a member of a group consisting of: a miniaturized image, text, statistical data related to a web page associated with a respective URI, and an opinion related to the web page.

12. The method of claim 1, wherein the response comprises a description of at least one web page containing the information snippets.

13. The method of claim 1, wherein the constructing comprises caching the response.

14. The method of claim 1, wherein the browser instructions instruct the browser to fetch the information snippets using hypertext transfer protocol (HTTP) commands.

15. A non-transitory computer-readable medium storing instructions executable by at least a computing device to implement a method of retrieving information, wherein the method comprising:

accessing, by a user using a web browser on a user device, a site comprising a search engine and entering a search query comprising a textual search term into the search engine;

processing, at the search engine side, the search query by analyzing words, topics, synonyms, or tags of a plurality of content servers;

identifying, at the search engine side, a plurality of uniform resource identifiers (URIs) of the plurality of content servers which hosts contents corresponding with search results to the search query generated based on the processing, wherein the identifying includes accessing the plurality of content servers by the search engine;

constructing, at the search engine side, browser instructions which include the plurality of URIs and instructions for extracting information snippets of content from each of the plurality of content servers using the plurality of URIs;

forwarding the browser instructions from the search engine to the user device as a response to the search query, wherein the response includes format instructions for the information snippets and does not include any copyrighted information from the plurality of content servers;

receiving the browser instructions at the user device;

processing, the browser instructions at the user device to trigger a transmission from the user device of requests for extracting the information snippets from the plurality of content servers by the web browser which is installed in the user device and using the plurality of URIs;

retrieving, at the user device, the information snippets directly from the plurality of content servers and not from the search engine;

formatting, at the user device, the retrieved information snippets according to the format instructions in the received response; and displaying the formatted information snippets to the user, wherein the browser instructions do not include any copyrighted information from the plurality of content servers.

16. The method of claim 15, wherein the response is encoded in at least one of hypertext transfer protocol (HTTP) and a Secure HTTP (HTTPS) format.

17. The response of claim 15, wherein the response further comprises at least one formatting command and the displaying is performed according to the at least one formatting command.

18. A system for providing a response to a search query, comprising a computerized processor implemented at least partially by hardware to retrieve information, wherein the processor is configured to implement a method comprising:

accessing, by a user using a web browser on a user device, a site comprising a search engine and entering a search query comprising a textual search term into the search engine;

processing, at the search engine side, the search query by analyzing words, topics, synonyms, or tags of a plurality of content servers;

identifying, at the search engine side, a plurality of uniform resource identifiers (URIs) of the plurality of content servers which hosts contents corresponding with search results to the search query generated based on the processing, wherein the identifying includes accessing the plurality of content servers by the search engine;

constructing, at the search engine side, browser instructions which include the plurality of URIs and instructions for extracting information snippets of content from each of the plurality of content servers using the plurality of URIs;

forwarding the browser instructions from the search engine to the user device as a response to the search query, wherein the response includes format instructions for the information snippets and does not include any copyrighted information from the plurality of content servers;

receiving the browser instructions at the user device;

processing, the browser instructions at the user device to trigger a transmission from the user device of requests for extracting the information snippets from the plurality of content servers by the web browser which is installed in the user device and using the plurality of URIs;

retrieving, at the user device, the information snippets directly from the plurality of content servers and not from the search engine;

formatting, at the user device, the retrieved information snippets according to the format instructions in the received response; and displaying the formatted information snippets to the user, wherein the browser instructions do not include any copyrighted information from the plurality of content servers.

19. The method of claim 15, wherein the information snippets include images.

20. The method of claim 1, wherein the browser issues fetching commands in a Hypertext Transfer Protocol (HTTP) protocol for extracting the information snippets.

* * * * *